United States Patent [19]

Goldsmith et al.

[11] Patent Number: 4,586,999

[45] Date of Patent: May 6, 1986

[54] THREE LAYER CARBON BASED ELECTRODE

[75] Inventors: Charles E. Goldsmith, Baton Rouge, La.; Thomas A. Patterson, Dalton, Ga.

[73] Assignee: The Dow Chemical Company, Midland, Mich.

[21] Appl. No.: 665,891

[22] Filed: Oct. 29, 1984

[51] Int. Cl.[4] .................. C25B 9/00; C25B 11/03; C25B 11/12

[52] U.S. Cl. .................. 204/265; 204/283; 204/284; 204/290 R; 204/294

[58] Field of Search ............ 204/290 R, 294, 283–284, 204/242, 263–266

[56] References Cited

U.S. PATENT DOCUMENTS 4,500,647 2/1985 Solomon .................. 204/290 R

Primary Examiner—Donald R. Valentine
Attorney, Agent, or Firm—James H. Dickerson, Jr.

[57] ABSTRACT

The invention is an electrode comprising:

(a) an electrically conductive first layer having a plurality of interconnecting passageways of an average diameter of from about 0.1 to about 1.0 microns, said first layer containing from about 2 to about 10 weight percent of a catalyst active for the reduction of oxygen, and having a hydrophobic carbon containing from about 85 to about 95 weight percent carbon and from about 5 to about 15 weight percent of a first hydrophobic material, (b) an electrically conductive second layer in fluid flow communication with the first layer and having a plurality of interconnecting passageways of an average diameter of from about 0.2 to about 10 microns,
said second layer physically contacting the first layer and containing from about 2 to about 10 weight percent of a catalyst active for oxygen reduction, and having a hydrophobic carbon having from about 60 to about 85 weight percent carbon and from about 15 to about 40 weight percent of a second hydrophobic material;

(c) a substantially completely electrically nonconductive, catalytically inactive third layer in physical contact and in fluid flow communication with said second layer, said third layer being substantially completely composed of a third hydrophobic material and having a plurality of interconnecting passageways of an average diameter of from about 2 to about 10 microns; and (d) an electrically conductive current collector in physical and electrical contact with said first layer.

15 Claims, 2 Drawing Figures

THREE LAYER CARBON BASED ELECTRODE

BACKGROUND OF THE INVENTION

Within the field of electrochemistry, there is a well-known type of an electrolytic cell known as a chlor-alkali cell. Basically this is a cell wherein chlorine gas and sodium hydroxide are produced by passing an electric current through an aqueous sodium chloride solution. The cathodes employed in such chlor-alkali cells are subjected to the corrosive environment of the sodium hydroxide.

Such cells are divided by a separator into anode and cathode compartments. The separator characteristically can be a substantially hydraulically impermeable membrane, e.g., a hydraulically impermeable cation exchange membrane, such as the commercially available Nafion ® manufactured by the E. I. duPont de Nemours & Company. Alternatively, the separator can be a porous diaphragm, e.g., asbestos, which can be in the form of vacuum deposited fibers or asbestos paper sheet, as are well known in the art. The anode can be a valve metal, e.g., titanium, provided with a noble metal coating to yield what is known in the art as a dimensionally stable anode. One of the unwanted by-products present in a chlor-alkali cell is hydrogen which forms at the cell cathode. This hydrogen production increases the power requirement for the overall electrochemical process, and eliminating its formation is one of the desired results in chlor-alkali cell operation.

Fairly recently, attention has been directed in chlor-alkali cell technology to various forms of oxygen depolarized cathodes. Such cathodes can result in significant savings in the cost of electrical energy employed to operate chlor-alkali cells. Estimates indicate that there is a theoretical savings of about 25 percent of the total electrical energy required to operate chlor-alkali cells provided that the formation of hydrogen at the cathode can be prevented. In other words, about 25 percent of the electrical energy employed in a chlor-alkali cell is used to form hydrogen at the cathode. Hence, the prevention of hydrogen formation by forming hydroxide at the cathode results in significant savings in the cost of electrical power. This is the major benefit of and purpose for oxygen depolarized cathodes.

One known form of oxygen depolarized cathode involves use of an active cathode layer containing porous active carbon particles whose activity in promoting the formation of hydroxide may or may not be catalyzed using precious metal catalyst materials, such as silver or platinum. Unfortunately, however, the pores of such active carbon particles may become flooded by the catholyte liquor thereby significantly reducing their ability to eliminate the formation of hydrogen at the cathode and resulting in decreased operating efficiency. Various attempts have been made to solve this wettability problem, e.g., by providing a backing layer which is hydrophobic to reduce the likelihood of wetting or flooding of the carbon particles in the active layer by the catholyte liquor. Various forms of polytetrafluoroethylene (PTFE) have been utilized for this purpose. Some oxygen depolarized cathodes contain PTFE in both the active layer and in a backing layer to impart hydrophobicity to the desired layer.

In a laminated or sintered electrode having a carbon-containing active layer and a PTFE-containing backing layer, the hydrophobicity of the backing layer resists penetration of alkali from the active layer of the electrode through the backing layer. If alkali bleeds through the backing layer, it interferes with the contact of oxygen (coming from the backing layer side) with the carbon particles in the active layer. If alkali bleeding is very heavy, it covers up the back of the electrode preventing oxygen from contacting the active layer carbon particles.

It would be desirable to have a carbon based electrode which minimizes the problem of alkali penetration of the backing layer and blocking access of the gas to the active portion of the electrode. The present invention provides such an electrode.

SUMMARY OF THE INVENTION

The invention is an electrode comprising:

(a) an electrically conductive, catalytically active, first layer having a plurality of interconnecting passageways of an average diameter of from about 0.1 to about 1.0 microns, said first layer containing from about 2 to about 10 weight percent of a catalyst active for the reduction of oxygen and having a hydrophobic carbon containing from about 80 to about 95 weight percent carbon and from about 5 to about 20 weight percent of a first hydrophobic material, (b) an electrically conductive, catalytically active, second layer in fluid flow communication with the first layer and having a plurality of interconnecting passageways of an average diameter of from about 0.2 to about 10 microns, said second layer physically contacting the first layer and containing a hydrophobic carbon having from about 60 to about 85 weight percent carbon and from about 15 to about 40 weight percent of a second hydrophobic material;

(c) a substantially completely electrically nonconductive, catalytically inactive third layer in physical contact and in fluid flow communication with said second layer, said third layer being substantially completely composed of a third hydrophobic material and having a plurality of interconnecting passageways of an average diameter of from about 2 to about 10 microns; and (d) an electrically conductive current collector in physical and electrical contact with said first layer.

DETAILED DESCRIPTION OF THE INVENTION

Figure 1:
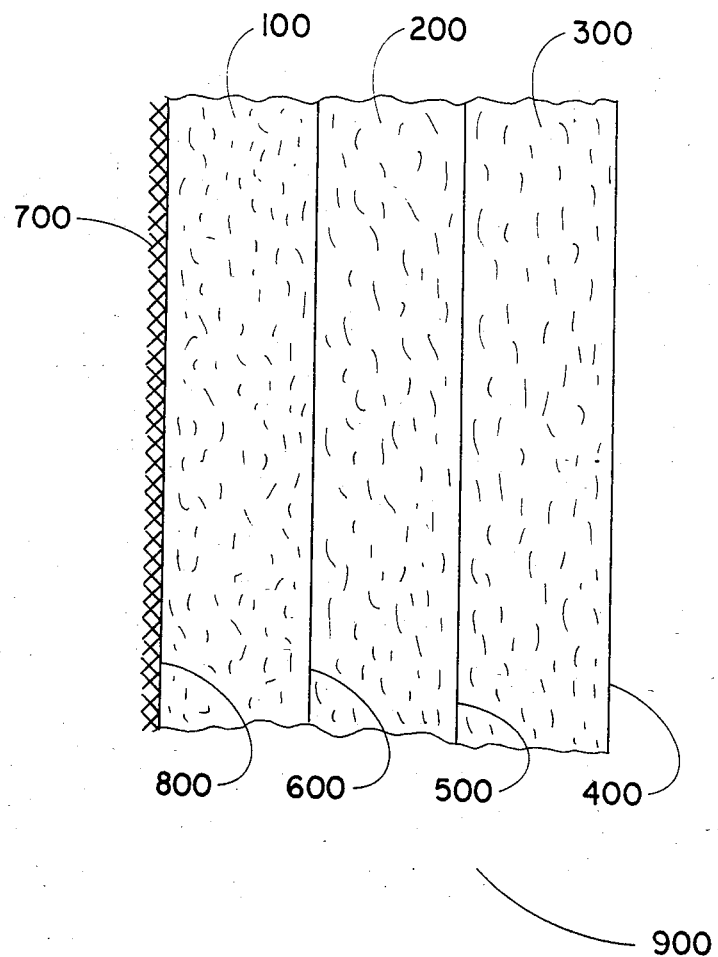
FIG. 1 shows one embodiment of the invention wherein a current collector 700 is in electrical contact with a surface 800 of a first layer 100 in a three layer electrode 900. The electrode also has a second layer 200 and a third layer 300.

The invention is a layered electrode having at least two electrically conductive layers, a third layer and a current collector.

In operation, in an electrochemical cell, the electrode of the present invention is normally positioned such that a liquid electrolyte is contacted with the first layer 100 and an oxygen-containing gas is contacted with the third layer 300. The liquid electrolyte is caused to permeate into and through the first layer 100, while the oxygen-containing gas is caused to permeate into and through the third layer 300. The gas and the electrolyte form a gas-liquid interface within the electrode where electrochemical reactions therebetween are caused to occur. The gas-liquid interface is thought to be primarily located at or near junction 600, the interface between the first face 100 and the second face 200.

Figure 2:
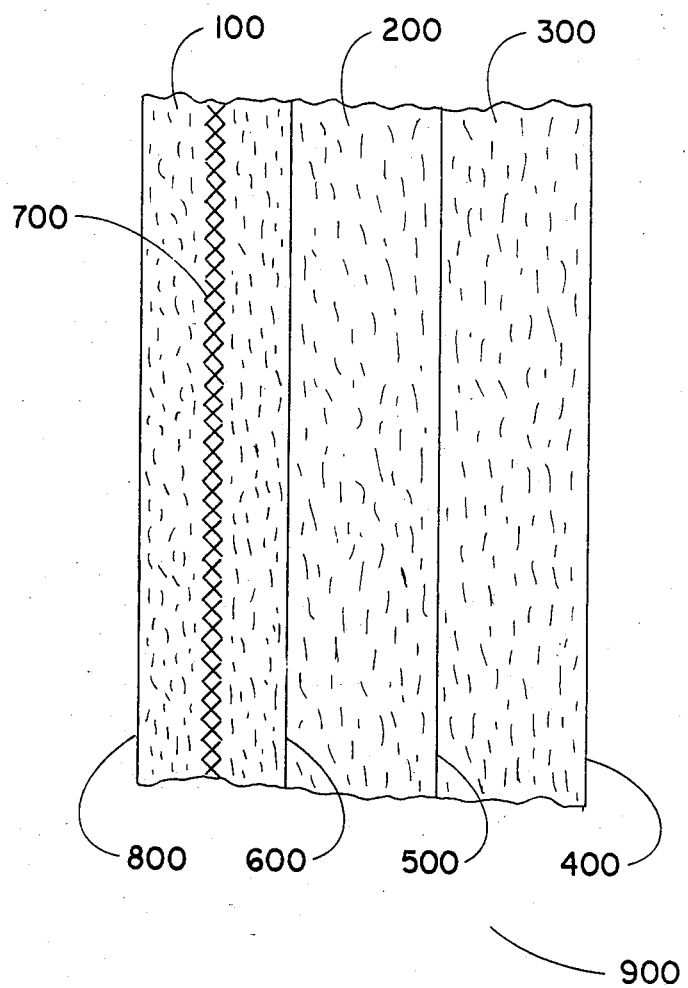
FIG. 2 shows another embodiment of the invention in which a current collector 700 is embedded into a first layer 100 of a three layer electrode. The electrode also has a second layer 200 and a third layer 300.

Referring to both FIGS. 1 and 2, a first electrically conductive layer 100 has a plurality of interconnecting passageways connecting a first surface 800 with a first layer/second layer interface 600. The passageways are preferably of a sufficiently large average diameter to allow a liquid electrolyte to pass from one surface of the layer to an opposing surface of the layer, yet of a sufficiently small average diameter to minimize the passage of gas from one surface to an opposing surface. For use in chlor-alkali electrolytic cells, it has been discovered that passageways having an average diameter between about 0.1 and about 1 micron fulfill this requirement.

The first layer 100 is preferably of sufficient thickness to inhibit the flow of gas therethrough, yet not so thick to inhibit the passage therethrough of a liquid electrolyte. For chlor-alkali electrolytic cells, it has been determined that thicknesses of from about 0.05 to about 1 mm and more preferable from about 0.1 to about 0.5 millimeters are suitable.

The first layer 100 contains a hydrophobic carbon having from about 85 to about 95 weight percent carbon and from about 5 to about 15 weight percent of a first hydrophobic material. Hydrophobic carbon is an intimate mixture of carbon and a hydrophobic material. It is thought that it is a carbon material substantially completely coated with a hydrophobic material.

Suitable hydrophobic materials can include any polymer having a low surface energy which will remain stable under chlor-alkali electrolysis cell operating conditions. Such polymers include polymers of various halogen-substituted hydrocarbon monomers, particularly fluorine-substituted olefinic monomers. Halogen-containing polymers that can be employed include polymers of fluorocarbons and substituted fluorocarbons wherein one or more fluorine atoms are replaced by hydrogen, chlorine, or bromine. Alternative halocarbon polymers include polytrifluoroethylene, polyvinylfluoride, polyvinylidene fluoride, polytrifluorochloroethylene, and copolymers of different fluorocarbon monomers such as copolymers of tetrafluoroethylene and hexafluoropropylene.

In addition to the halocarbon polymers, various other hydrophobic polymers which can be used include hydrocarbon polymers having a molecular weight of 50,000 to 1,000,000 or more, and a free surface energy close to or below that of polyethylene. Representative polymers include polymers and copolymers of ethylene, propylene, 3-ethyl-1-butene, 4-methyl-1-pentene, and 4,4-dimethyl-1-pentene. Silicone polymers are also suitable as hydrophobic polymers for use in the preparation of the electrodes of the invention.

A variety of first hydrophobic materials are suitable for use including, for example, polytetrafluoroethylene (PTFE). PTFE is the preferred hydrophobic material because of its excellent hydrophobic characteristics and its ready availability. PTFE, in various forms, is sold by E. I. duPont de Nemours & Co. under the trademark TEFLON ®.

Preferred hydrophobic polymers are the thermoplastic halocarbon polymers selected from the group consisting of at least one of polymers of tetrafluoroethylene, fluorinated ethylene propylene, copolymers thereof having the moieties ($-CX_1X_2-CX_3CX_4-$) and ($-CY_1Y_2-CY_3Y_4-$), and homopolymers having the moieties ($-CCY_1Y_2-CY_3F-$) wherein $X_1$, $X_2$, $X_3$, $X_4$, $Y_1$, $Y_2$, $Y_3$ and $Y_4$ are selected from the group consisting of fluorine, chlorine, and hydrogen, at least one of said X and Y being fluorine. Preferably the halocarbon polymer is a fluorocarbon polymer selected from the group consisting of at least one of copolymers having an ethylene moiety and a fluorocarbon moiety chosen from the group consisting of ($-CFH-CH_2-$), ($-CF_2-CH_2-$), ($-CF_2-CFH-$), and ($-CH_2-CClF-$).

The first layer 100 preferably contains a catalyst active for the reduction of oxygen. Suitable catalysts include, for example, platinum, silver, and transition metal oxides. Preferably, the catalyst is distributed relatively evenly throughout the first layer 100 to provide the maximum exposure of the catalyst. The concentration of the catalyst is not critical, so long as an operable amount is present. Preferably, the catalyst is present at from about 2 to about 10 weight percent, based on the total weight of carbon in the first layer 100.

A second electrically conductive layer 200 is in physical contact with the first layer and has a plurality of interconnecting passageways connecting a first layer/second layer interface 600 with a second layer/third layer interface 500. The passageways of the second layer 200 are in fluid flow communication with the passageways of the first layer 100. The average diameter of the passageways in the second layer 200 are preferably larger than the average diameters of the passageways in the first layer 100. They are preferably of a sufficiently average diameter to allow a gas to flow from one interface of the second layer 200 to an opposing interface of the second layer 200, while, at the same time, minimizing the passage of a liquid electrolyte from one interface to an opposing interface. For use in chlor-alkali cells, it has been discovered that passageways having an average diameter between about 0.2 and about 10 microns fulfill this requirement.

The second layer 200 is also preferably of a sufficient thickness to inhibit the flow of liquid therethrough, yet not so thick as to substantially inhibit the passage therethrough of a gas. For use in chlor-alkali electrolytic cells, preferable thicknesses of the second layer 200 are from about 0.005 to about 1.0 millimeters and more preferably from about 0.1 to about 0.5 mm.

In addition, the second layer also contains a hydrophobic carbon having from about 60 to about 85 weight percent carbon and from about 15 to about 40 weight percent of a hydrophobic material.

The same type of hydrophobic materials described as suitable for use in the first layer are suitable for use in the second layer as the second hydrophobic material.

The second layer 200 also preferably contains a catalyst active for the oxygen reduction. The same type of catalyst suitable for use in the first layer is also suitable for use in the second layer. Preferably, the catalyst is distributed relatively evenly throughout the second layer 200 to provide the maximum benefit. Preferably, the catalyst is present at from about 2 to about 10 weight percent, based on the total weight of carbon in the second layer.

The third layer 300 is a barrier layer which is permeable to a gas yet substantially completely impermeable to liquids. Preferably it is substantially completely electrically non-conductive and uncatalyzed. It is in physical contact with the second layer and has a plurality of interconnecting passageways connecting the second layer/third layer interface 500 with a second surface 400. The passageways of the third layer 300 and the second layer 200 are in fluid flow communication with each other. The passageways of the third layer 300 preferably are of a larger average diameter than the passageways of the second layer 200 and preferably have an average diameter of from about 2 to about 10 microns. For use as an electrode in a chlor-alkali cell, the thickness of the third layer is preferably from about 0.05 to about 1 mm and more preferably from about 0.30 mm to about 0.5 mm.

The same type of hydrophobic materials suitable for use in the first and second layers are suitable for use in the third layer as the third hydrophobic material.

An electrically conductive current collector 700 is present in the electrode to provide an electrical connection between the electrode 900 and a power supply (not shown). In the case where the electrode of the present invention is used in a fuel cell, current collector 700 provides an electrical connection between the electrode 900 and a resistance load (not shown).

Preferably, the current collector 700 is in physical contact with the first layer 100. This provides the maximum amount of current flow through the electrode since the first layer 100 contains more carbon than the second layer and, hence, is more electrically conductive than the second layer. Optionally, the current collector 700 may be in physical contact with the second layer 200 (not illustrated).

Optionally, the current collector 700 may contact the surface 800 of the first layer 100 (as shown in FIG. 1) or it may be embedded into the first layer 100 (as shown in FIG. 2).

The current collector 700 is preferably a metallic structure and may take a variety of forms. For example, it may be a plurality of wires, a screen, expanded mesh or a variety of other physical structures. To provide even current distribution throughout the length and width of the electrode 900, the current collector 700 is preferably present throughout the length and width of the electrode 900. More preferably it is a high surface area material and is present throughout the length and width of the electrode. Such a requirement is conveniently provided by a fine screen or a fine expanded mesh structure. Preferably, the openings in such a structure are from about 0.01 to about 10 mm.

The current collector 700 should be sufficiently electrically conductive to provide a pathway for the passage of a sufficient amount of electrical current to cause electrochemical reaction to occur. Materials such as iron, steel, nickel, silver, gold, platinum, and silver plated electrically conductive metals (silver plated nickel) are particularly suitable.

In preparing the electrodes of the present invention, the three layers are preferably prepared individually and subsequently joined.

The first layer 100 may be conveniently prepared by first forming a hydrophobic carbon by blending carbon with a hydrophobic material to intimately disperse the hydrophobic material with the carbon and preferably coat the hydrophobic material onto the surface of the carbon.

Preferably the carbon has a high surface area. More preferably it has a particle size from about 0.02 to about .1 micron. Suitable sources of carbon include, for example, Vulcan ® XC-72 (a trademark of Cabot Corporation) and Ketjenblack ®, (a trademark of Armak Company). Prior to being blended with the hydrophobic material, the carbon may optionally be pretreated and cleaned by heating the carbon to about 800° Celsius in an inert gas atmosphere, cooling, and washing the carbon with an acid such as hydrochloric acid.

For the first layer 100, it is preferable to use a mixture containing from about 85 to about 95 weight percent carbon and from about 5 to about 15 weight percent hydrophobic material.

To maximize the contact between the carbon and hydrophobic material during blending, it is convenient to use a lubricant. The lubricant is a material which enhances mixing and helps distribute the hydrophobic material onto the surfaces of the carbon. Preferably, the lubricant is a hydrocarbon liquid because most organic liquids are easily absorbed by the hydrophobic material. Preferably the lubricant is an aliphatic or aromatic hydrocarbon or mixtures thereof which are liquid at the temperatures utilized in making the dispersions. Representative aliphatic hydrocarbons include pentane, hexane, heptane, and octane. Representative aromatic hydrocarbons include benzene, toluene, xylene, cycloaliphatic hydrocarbons such as cyclohexane. Suitable lubricants also include low, medium, and high boiling mineral oil fractions which may contain mixtures of aliphatic hydrocarbons, naphthenes, and aromatic hydrocarbons. The lubricant can also be a halogenated hydrocarbon such as carbon tetrachloride or trichloroethylene, or a silicone oil such as polydimethylsiloxane having a suitable viscosity such as a viscosity of about 100 centistokes, or a perfluorocarbon oil, or other types of organic liquids such as aliphatic and aromatic alcohols, glycols, and amino alcohols. Representative useful aliphatic alcohols include isopropanol, 2-butanol, 2-methyl-2-butanol, isobutanol, n-butanol, 2-pentanol, 3-pentanol, 3-hexanol, 4-heptanol, 2-ethyl-1-hexanol, etc. Representative useful aromatic alcohols include particularly the aralkyl alcohols such as benzyl alcohol, 3-methylbenzyl alcohol, 3-phenylpropanol, etc. Generally, the useful alcohols are free of aliphatic unsaturation and have hydroxy substituents on aliphatic carbon atoms, and contain up to 16 carbon atoms. Representative glycols include 1,2-ethanediol, 1,2-propanediol, mixtures of glycerol and ethylene glycol, diethylene glycol, etc. Representative amino alcohol dispersion media include ethanolamine, diethanolamine, triethanolamine, etc.

Preferably the lubricant is Varsol ® solvent (a trademark of Exxon Corp.) because of its highly suitable lubrication characteristics.

Since the lubricant is subsequently removed from the mixture, it is desirable to use only the amount required to make blending easier.

During blending, the mixture may be heated to temperatures as high as 60°–90° C. to enhance mixing. This is especially helpful since it enhances the activity of the lubricant.

To obtain the maximum benefit from the electrodes of the present invention, it is preferably that the hydrophobic material be intimately coated onto the surfaces of the carbon particles. Thus, blending involves more than merely admixing the carbon with the hydrophobic material. Rather, it involves physically distributing the hydrophobic material onto the surfaces of the carbon. This may be accomplished in a variety of known ways. For example, the hydrophobic material and the carbon may be blended with a lubricant and subjected to high speed agitation to intimately disperse the hydrophobic material and the carbon. Suitable high speed agitation may be provided, for example, by a Waring ® blender (a trademark of Dynamics Corporation of America). Such blenders have sharp blades which rotate at speeds up to about 15,000 to about 20,000 revolutions per minute. The degree of distribution of the materials into each other is proportional to the time the mix is subjected to the high speed agitation and the speed of the blender blades. Using a Waring ® blender operating at about 15,000 rpm, suitable times appear to be from about 5 to about 15 minutes when a lubricant is used. This method is illustrated in Example 1.

An optional, and equally suitable, means for coating the carbon with a hydrophobic material is shown in U.S. Pat. No. 4,317,789. That method involves the mixing of an aqueous PTFE emulsion and a carbon dispersion while maintaining the mixture at a temperature of less than about 18° Celsius to avoid spontaneous recipitation. After the components are mixed, the temperature of the mixture is increased to about 25° to 30° Celsius to initiate precipitation of PTFE coated carbon particles. The precipitate is removed, washed, dried, and used to prepare an electrode. This method is illustrated in Example 2.

Once the carbon has been coated with a hydrophobic material, a substantial portion of the lubricant is preferably removed before further processing steps are conducted. The lubricant may be removed in a variety of ways including, for example, heating the mixture to vaporize the lubricant and compressing or calendering the mixture to physically force the lubricant out. Calendering is a process involving two rolls having an adjustable distance between the two rollers through which the mixture of materials to be compressed is passed. The distance between the rollers is decreased with each successive pass. It is not necessary that all of the lubricant be removed; however, it is desirable to remove enough so that the mixture is sufficiently solid so that it can be easily laminated with other layers to form the electrode.

The third layer 300 may be prepared using a variety of methods. One particularly convenient means involves blending a hydrophobic material such as PTFE with a fugitive material and a lubricant using the methods described for the preparation of the first and second layers. This mixture may then be formed into a sheet by, for example, calendering.

Suitable fugitive materials include, for example, volatile materials and soluble materials, for example, nickel formate, inorganic chlorides, carbonates, sulfates, nitrates and other soluble inorganic salts.

The fugitive material may be removed before, or after, the mixture is formed into a sheet. Likewise, it may be removed before, or after, the third layer is joined to the other layers. Preferably, the fugitive material is removed after the third layer 300 is joined to the second layer 200. This preserves the porosity of the third layer 300.

The fugitive material may be removed by, for example, heating to vaporize a volatile fugitive material or washing with a suitable solvent to dissolve a soluble material.

The amount, and particle size, of the fugitive material may be varied to adjust the number and size of the passageways resulting when the fugitive material is removed.

Optionally, the first layer 100 may contain a catalyst active for the reduction of oxygen. The catalyst may be introduced in a variety of ways; for example, it may be blended in situ with the carbon/hydrophobic material mixture; applied to the carbon prior to the carbon being mixed with the hydrophobic material; or applied to the carbon after it has been coated with the hydrophobic material. However, the latter method minimizes the amount of catalyst contacting the carbon (where it is needed) and is not the preferred method for applying the catalyst.

A catalyst may be added to the carbon/hydrophobic mixture in one of several ways. It may be introduced into the lubricant/carbon/hydrophobic material mixture and blended in the Waring ® blender, or it can be dispersed onto the surface of the carbon before the carbon is mixed with the hydrophobic material in the Waring ® blender. If the precipitation method for forming hydrophobic carbon is used, the catalyst may be introduced into the carbon/PTFE mixture and precipitated with the PTFE-coated carbon. Or, it may be coated onto the carbon before the carbon is mixed with the PTFE emulsion.

Optionally, only a portion of the carbon may be treated with a catalyst prior to the full amount of carbon being coated with a hydrophobic material. For chloralkali cells using silver as a catalyst, operable amounts have been found to be from about 2 to about 10 weight percent of the total weight of carbon in the layer.

EXAMPLE 1

A. Preparation of Catalyzed Carbon

About 30 grams of silver acetate (a silver catalyst precursor) was dissolved in about 3 liters of deionized water by stirring for about 3 hours at ambient temperature. A light shield was used to protect the solution from being decomposed by ambient light. About 300 grams of Vulcan ® XC-72 carbon having a particle size of about 30 millimicrons was added to the solution and stirred for about 3 hours to allow the carbon to absorb the silver acetate. The mixture was filtered and the precipitate was dried at 90°–110° C. overnight. The dried material was broken up with a mortar and pestle and heated at about 350° C. under a nitrogen atmosphere for about 4 hours to decompose the silver acetate and deposit silver onto the carbon. This catalyzed carbon was then used to prepare the first and second layers of an electrode.

B. Preparation of First Layer

About 30 grams of Teflon 6 powder about 400–600 microns in size (a commercial product available from E. I. duPont de Nemours & Co.) was blended with about 1.06 liters of Varsol at about 75° C. for about 6 minutes in a Waring ® blender at high speed (approximately 20,000 revolutions per minute). About 270 grams of catalyzed carbon and about 3.7 liters of Varsol at ambient temperature were added to the mixture. The mixture was blended for an additional 6 minutes at about 15,000 rpms in a Waring ® blender. It was then filtered and pressed at about 421 kg/cm$^2$ for about 4 minutes.

The first layer was then calendered using a two-roll mill. The material was positioned between two rubber sheets during calendering to prevent it from sticking to the calender rollers and was passed through the calender a plurality of times. Between passes, the material was periodically rotated 90° and folded. Between passes, the distance between the rollers was progressively decreased between passes to reduce the thickness of the sheet. After calendering, the thickness of the first layer was found to be about 0.5 mm.

C. Preparation of the Second Layer

A mixture containing about 1 liter of Varsol ® at about 75° C. was added to a Waring ® blender. About 60 grams of Teflon 6, having an average particle size of about 500 microns was added and the blender was operated for about six minutes at high speed (about 20,000 rpm). Then, an additional 3 liters of Varsol ® and about 240 grams of catalyzed carbon (prepared in step A) were added to the blender. The mixture was then blended for about four minutes and filtered under vacuum until enough Varsol ® had been removed for the material to crack. The precipitate was then transferred to a 412 square centimeter press which had been fitted with filter paper. The pressure was gradually increased to about 412 kg/cm². The gradual increase in pressure minimized the amount of material squeezed out of the press. The cake was then removed from the press and calendered to a final thickness of 0.5 mm using a two-roll mill. The material was periodically folded and rotated 90° during calendering. The material was positioned between two rubber sheets during the initial few passes through the calender to prevent the material from sticking to the rollers.

D. Preparation of the Third Layer

About one liter of Varsol ® heated to about 75° C. and about 238 grams Teflon 6 having a particle size of about 500 microns were added to a Waring ® blender. The mixture was blended for about six minutes at high speed. Then, an additional 3 liters of Varsol ® and about 952 grams of NaCl (fugitive material) were added to the blender and the mixture was blended for an additional six minutes at high speed. The mixture was filtered under vacuum. The precipitate was then transferred to a press and pressed for four minutes at about 140 kg/cm² under vacuum. The material was calendered to a thickness of about 0.5 mm.

E. Lamination

The second layer and the third layer were laminated to each other by contacting an approximately 0.5 mm thick sheet of the second layer material (prepared above) with an approximately 0.5 mm thick third layer material (prepared above) and passing them through an opening between two rollers one time. The pressure exerted by the rollers onto the layers caused them to be laminated to each other and reduced the overall thickness of the two layers to approximately 0.76 mm.

Thereafter, this material was laminated with the first layer material. The second face material in the laminate was contacted with the first layer material (prepared above) and calendered as above. The resulting laminate was approximately 0.76 mm thick.

A silver plated nickel wire mesh current collector having a thickness of about 0.13 mm was pressed into the first layer material portion of the laminate using calendering techniques. The resulting laminate was about 0.76 mm thick and was composed of a current collector pressed into a first layer material, a center portion composed of the second layer material and another exposed surface layer (composed of the third layer material), all as shown in FIGS. 1 and 2.

EXAMPLE 2

A. Preparation of Catalyzed Carbon

About 30 grams of silver acetate (a silver catalyst precursor) was dissolved in about 3 liters of deionized water by stirring for about 3 hours at ambient temperature. A light shield was used to protect the solution from being decomposed by ambient light. About 300 grams of Vulcan ® XC-72 carbon having a particle size of about 30 millimicrons was added to the solution and stirred for about 3 hours to allow the carbon to absorb the silver acetate. The mixture was filtered and the precipitate was dried at 90°-110° C. overnight. The dried material was broken up with a mortar and pestle and heated at about 350° C. under a nitrogen atmosphere for about 4 hours to decompose the silver acetate and deposit silver onto the carbon. This catalyzed carbon was then used to prepare the first and second layer of an electrode.

B. Preparation of First Layer

About 50 grams of Teflon 30B ® solution (30 grams actual Teflon, 20 grams water and surfactant) and about 4 liters of water using a lab stirrer were cooled to about 15° C. while being stirred for about 2 hours. Thereafter, while continuing to stir, about 270 grams of catalyzed carbon (as prepared in Step A) were added. The mixture was heated to about 30° C. while continuing stirring at about 7500 rpm. Stirring was continued for about 1 hour. The mixture was filtered and the precipitate was dried in an oven at about 110° C. for about 16 hours. After the mixture had been cooled, about 300 grams of Varsol ® at ambient temperature was added. The material was pressed at 421 kg/cm² to remove excess Varsol.

The first layer material was then calendered using a two-roll mill. The material was positioned between two rubber sheets during calendering to prevent it from sticking to the calender rollers and was passed through the calender a plurality of times. Between passes, the material was periodically rotated 90° and folded. After caldering, the thickness was found to be about 0.5 mm.

C. Preparation of the Second Layer

After 100 grams of Teflon 30B ® solution (60 grams Teflon and 40 grams water and surfactant) and about 4 liters of water were cooled to 15° C. while being stirred. Thereafter, about 240 grams of catalyzed carbon (as prepared in Step A) were added. The mixture was heated to about 30° C. while stirring at about 7500 rpm. Stirring was continued for about 1 hour. The mixture was filtered and the precipitate was dried in an oven at about 110° C. for about 16 hours. After the mixture had been cooled, about 300 grams of Varsol ® at ambient temperature was added. The material was pressed at about 421 kg/cm² to remove excess Varsol.

The second layer was then calendered using a two-roll mill. The material was positioned between two rubber sheets during calendering to prevent it from sticking to the calender rollers and was passed through the calender a plurality of times. Between passes, the material was periodically rotated 90° and folded. After calendering, the thickness was found to be about 0.5 mm.

D. Preparation of the Third Layer

About one liter of Varsol ® heated to about 75° C. and about 238 grams Teflon 6 having a particle size of about 500 microns were added to a Waring ® blender. The mixture was blended for about six minutes at high speed. Then, an additional 3 liters of Varsol ® and about 952 grams of NaCl (fugitive material) were added to the blender and the mixture was blended for an additional six minutes at high speed. The mixture was filtered under vacuum. The precipitate was then transferred to a press and pressed for four minutes at about 140 kg/cm$^2$ under vacuum. The material was calendered to a thickness of about 0.5 mm.

E. Lamination

The second layer and the third layer were laminated to each other by contacting an approximately 0.5 mm thick sheet of the second layer material (prepared above) with an approximately 0.5 mm thick third layer material (prepared above) and passing them through an opening between two rollers one time. The pressure exerted by the rollers onto the layers caused them to be laminated to each other and reduced the overall thickness of the two layers to approximately 0.76 mm.

Thereafter, this laminated material was laminated with the first layer material. The second face material in the laminate was contacted with the first layer material prepared above and calendered as above. The resulting laminate was approximately 0.76 mm thick.

A silver plated nickel wire mesh current collector having a thickness of about 0.13 mm was pressed into the first layer material portion of the laminate using calendering techniques. The resulting laminate was about 0.76 mm thick and was composed of a current collector pressed into a first layer material, a center portion composed of the second layer material and another exposed surface layer (composed of the third layer material), all as shown in FIGS. 1 and 2.

EXAMPLE 3

The electrode prepared in Example 1 was leached with water to remove the sodium chloride from the third layer, thereby producing a porous fluid layer.

A 0.2 inch square portion of the electrode was then positioned in a laboratory electrolytic cell as the cathode. The cell had a gas chamber contacting one side of the electrode and an electrolyte chamber contacting the opposite side of the electrode. The electrolyte chamber also contacted a nickel woven wire anode. An aqueous solution containing about 250 grams NaOH per liter of water was introduced into the electrolyte chamber and oxygen, supplied from a commercially purchased oxygen cylinder, was introduced into the gas chamber at a pressure of about 2 pounds per square inch. The electrolyte was heated to about 75 degrees celcius and current was passed between the two electrodes at about 0.5 amps per square inch of cathode surface area using a Hewlett Packard 6205B dual D.C. power supply. Oxygen permeated into the interior portions of the cathode from the gas chamber and electrolyte permeated into the interior portions of the electrode from the electrolyte chamber. The passage of electrical current caused oxygen to be reduced at the cathode to produce hydroxyl ions and oxidation of hydroxyl ions at the anode to produce oxygen. The electrode operated at a potential of about −0.284 volts, as compared to a standard colomel electrode. After about 24 hours, the current density was increased to about 2.5 amps per square inch and the electrode potential increased to about −0.420 volts, as compared to a standard colomel electrode. The cell was operated for 84 days using deionized water addition to maintain the electrolyte level. After 30 days, the electrode potential had increased to about −0.483 volts, compared to a standard colomel electrode. After 57 and 81 days, the electrode potential had increased to about −0.764 and −0.788, respectively. This increase was thought to be caused by the filling of an increasing number of electrode pores with water, thereby preventing oxygen from entering the pores.

After 84 days, the oxygen supply was lost and the electrode potential reached −1.8 volts, compared to a standard colomel electrode. This indicated almost complete failure of the electrode caused by almost complete filling of the pores with electrolyte.

We claim:

1. An electrode comprising:
   (a) an electrically conductive first layer having a plurality of interconnecting passageways of an average diameter of from about 0.1 to about 1.0 microns, said first layer containing from about 2 to about 10 weight percent of a catalyst active for the reduction of oxygen, and having a hydrophobic carbon containing from about 80 to about 95 weight percent carbon and from about 5 to about 20 weight percent of a first hydrophobic material,
   (b) an electrically conductive second layer in fluid flow communication with the first layer and having a plurality of interconnecting passageways of an average diameter of from about 0.2 to about 10 microns, said second layer physically contacting the first layer and containing from about 2 to about 10 weight percent of a catalyst active for the oxygen reduction, and having a hydrophobic carbon containing from about 60 to about 85 weight percent carbon and from about 15 to about 40 weight percent of a second hydrophobic material, provided said second layer is more hydrophobic than said first layer;
   (c) a substantially completely electrically nonconductive, catalytically inactive third layer in physical contact and in fluid flow communication with said second layer, said third layer being substantially completely composed of a third hydrophobic material and having a plurality of interconnecting passageways of an average diameter of from about 2 to about 10 microns; and
   (d) an electrically conductive current collector in physical and electrical contact with said first layer.

2. The electrode of claim 1 wherein the first, second and third hydrophobic materials are independently selected from the group consisting of at least one of polymers of tetrafluoroethylene, fluorinated ethylene propylene, copolymers thereof having the moieties (—CX$_1$X$_2$—CX$_3$CX$_4$—) and (—CY$_1$Y$_2$—CY$_3$Y$_4$—), and homopolymers having the moieities (—C-CY$_1$Y$_2$—CY$_3$F—) wherein X$_1$, X$_2$, X$_3$, X$_4$, Y$_1$, Y$_2$, Y$_3$, and Y$_4$ are selected from the group consisting of fluorine, chlorine and hydrogen, at least one of said X and Y being fluorine.

3. The electrode of claim 1 wherein the first, second and third hydrophobic materials are polytetrafluoroethylene.

4. The electrode of claim 1 wherein the first, second and third hydrophobic materials are fluorinated ethylene propylene.

5. The electrode of claim 1 wherein the first layer has a thickness of from about 0.1 to about 0.5 millimeters.

6. The electrode of claim 1 wherein the second layer has a thickness of from about 0.1 to about 0.5 millimeters.

7. The electrode of claim 1 wherein the third layer has a thickness of from about 0.3 mm to about 0.5 millimeters.

8. The electrode of claim 1 wherein the current collector is in physical contact with an exposed surface of the first layer.

9. The electrode of claim 1 wherein the current collector is embedded into the first layer.

10. The electrode of claim 1 wherein the current collector is selected from the group consisting of metallic wire, metallic screen or an expanded metal mesh.

11. The electrode of claim 10 wherein the current collector is composed of a material selected from the group consisting of iron, steel, nickel, silver, gold, platinum and silver plated electrically conductive metals.

12. The electrode of claim 1 wherein the catalyst in the first layer and in the second layer is independently selected from the group consisting of:

platinum, silver and transition metal oxides.

13. An electrochemical cell suitable for electrochemically reacting a gas with a liquid, said cell comprising at least two electrodes, wherein at least one of the electrodes is a laminated electrode having:

(a) an electrically conductive first layer having a plurality of interconnecting passageways of an average diameter of from about 0.1 to about 1.0 microns, said first layer containing from about 2 to about 10 weight percent of a catalyst active for the reduction of oxygen, and having a hydrophobic carbon containing from about 80 to about 95 weight percent carbon and from about 5 to about 20 weight percent of a first hydrophobic material, (b) an electrically conductive second layer in fluid flow communication with the first layer and having a plurality of interconnecting passageways of an average diameter of from about 0.2 to about 10 microns, said second layer physically contacting the first layer and containing from about 2 to about 10 weight percent of a catalyst active for the oxygen reduction, and having a hydrophobic carbon containing from about 60 to about 85 weight percent carbon and from about 15 to about 40 weight percent of a second hydrophobic material provided said second layer is more hydrophobic than said first layer;

(c) a substantially completely electrically nonconductive, catalytically inactive third layer in physical contact and in fluid flow communication with said second layer, said third layer being substantially completely composed of a third hydrophobic material and having a plurality of interconnecting passageways of an average diameter of from about 2 to about 10 microns; and (d) an electrically conductive current collector in physical and electrical contact with said first layer.

14. The electrochemical cell of claim 13 wherein the laminated electrode is a cathode.

15. The electrochemical cell of claim 13 including a chamber adapted to contain an oxygen-containing gas connected with the third layer of the laminated electrode.

* * * * *